United States Patent [19]

Kawamura et al.

[11] Patent Number: 5,173,648

[45] Date of Patent: Dec. 22, 1992

[54] NUMERICAL CONTROL METHOD

[75] Inventors: Hideaki Kawamura; Kentaro Fujibayashi, both of Tokyo; Takashi Endo, Yamanashi, all of Japan

[73] Assignee: Fanuc Ltd., Tokyo, Japan

[21] Appl. No.: 459,838

[22] PCT Filed: May 22, 1989

[86] PCT No.: PCT/JP89/00507

§ 371 Date: Jan. 29, 1990

§ 102(e) Date: Jan. 29, 1990

[87] PCT Pub. No.: WO89/12263

PCT Pub. Date: Dec. 14, 1989

[30] Foreign Application Priority Data

May 31, 1988 [JP] Japan .................................. 63-133243

[51] Int. Cl.$^5$ ...................... G05B 19/18; G05B 19/403
[52] U.S. Cl. ................................. 318/568.13; 318/567;
318/568.1; 364/167.01
[58] Field of Search ................. 318/560-636;
364/474.03, 474.32

[56] References Cited

U.S. PATENT DOCUMENTS

| | | | |
|---|---|---|---|
| 4,513,379 | 4/1985 | Wilson et al. | 364/167 X |
| 4,606,001 | 8/1986 | Rieben et al. | 364/167 |
| 4,860,191 | 8/1989 | Nomura et al. | 364/200 |
| 4,931,709 | 6/1990 | Ikeda et al. | 318/567 |
| 4,953,082 | 8/1990 | Nomura et al. | 364/200 |

Primary Examiner—Paul Ip
Attorney, Agent, or Firm—Staas & Halsey

[57] ABSTRACT

NC programs (11a-11d) are provided for corresponding ones of movable elements for prescribed axes, and the movable elements are moved by performing numerical control processing in numerical controllers (12a-12d) based on the NC programs. A plurality of axes to be synchronously controlled are designated by a synchronous axis command (SANC) inserted in the main NC program (11a), queuing commands (WNC) are inserted in the NC programs conforming to the movable elements which include the designated axes, and the corresponding movable elements are moved and controlled by performing numerical control processing while synchronization is achieved by the queuing commands.

2 Claims, 6 Drawing Sheets

NUMERICAL CONTROL METHOD

BACKGORUND OF THE INVENTION

Field of the Invention

This invention relates to a numerical control method and, more particularly, to a numerical control method in which synchronously controlled axes are designated by an NC program (numerical control).

SUMMARY OF THE INVENTION

A numerical control apparatus sometimes performs predetermined machining while synchronously controlling two or more movable elements. For example, in an NC four-axis lathe, first and second NC programs each having a queuing command are provided for corresponding ones of first and second tool rests, and a workpiece is subjected to machining by independently controlling the movement of the tool rests in accordance with the corresponding first and second NC programs while synchronization is achieved by virtue of the queuing commands. FIG. 8 shows an example of such first and second NC programs, in which 1a, 2a denote program numbers, 1b, 2b program portions for executing first machining, 1c, 2c first queuing commands, 1d, 2d program portions for executing second machining, 1e, 2e second queuing commands, 1f, 2f program portions for executing third machining, 1g, 2g third queuing commands, 1h, 2h program portions for executing fourth machining, 1i, 2i fourth queuing commands, 1j, 2j program portions for executing fifth machining, and 1k, 2k tape end commands.

In accordance with the first and second NC programs, the first and second tool rests subject the workpiece to machining simultaneously by the program portions 1b, 2b (simultaneous independent operation), and the tool rest which finishes machining first waits, in response to the first queuing command "M100", until the NC controller of the other reads in the first queuing command "M100". When the NC controller of the other reads in "M100", simultaneous independent operation is performed by the program portions 1d, 2d, and the tool rest which finishes machining first similarly waits, in response to the second queuing command "M200", until the NC controller of the other reads in the second queuing command "M200". Thereafter, similar four-axis control is carried out and simultaneous four-axis machining ends in response to the tape end command M30.

Conventionally, axes capable of being synchronously controlled are set in advance by parameters and synchronous control is performed only with regard to the set axes.

For example, assume that the numerical control apparatus of a simultaneous four-axis lathe has been set by parameters so as to be capable of performing synchronous control solely with regard to the axes constituting two tool rests for turning work. If the apparatus is to control a machine tool having, in addition to these two tool rests for turning, a tool rest for separate turning work, a tool rest for drilling or a tool rest for grooving, it will be possible to synchronously control only those axes constituting the two turning tool rests which have been set by the parameters; the other tool rest for turning, drilling or grooving will not be synchronously controllable.

Consequently, a problem encountered in the prior art is that even if synchronous control can be performed, axes which do not participate in machining may exist, as a result of which machining efficiency declines.

Another problem in the prior art is that axes that are synchronously controllable are limited to those capable of being controlled independently of one another.

SUMMARY OF THE INVENTION

Accordingly, an object of the present invention is to provide a numerical control method through which a plurality of synchronously controlled axes can be designated at will by NC programs during automatic operation, thereby eliminating idling axes and making possible highly efficient machining.

Another object of the present invention is to provide a numerical control method through which a plurality of superposed axes can be synchronously controlled, including an axis and another axis located thereon, yet a further axis located on this other axis, and so on.

According to the present invention, an NC program provided for each corresponding movable element on each prescribed axis. A plurality of axes to be synchronously controlled are designated from a prescribed NC program. Quening commands are inserted in the NC programs conforming to the movable elements which include the designated axes. The corresponding movable elements are moved and controlled while synchronization is achieved by the queuing commands. In accordance with the invention, a plurality of synchronously controlled axes can be designated at will by NC programs, thereby eliminating idling axes and making possible highly efficient machining.

DESCRIPTION OF THE PREFERRED EMBODIMENTS

Figure 1:
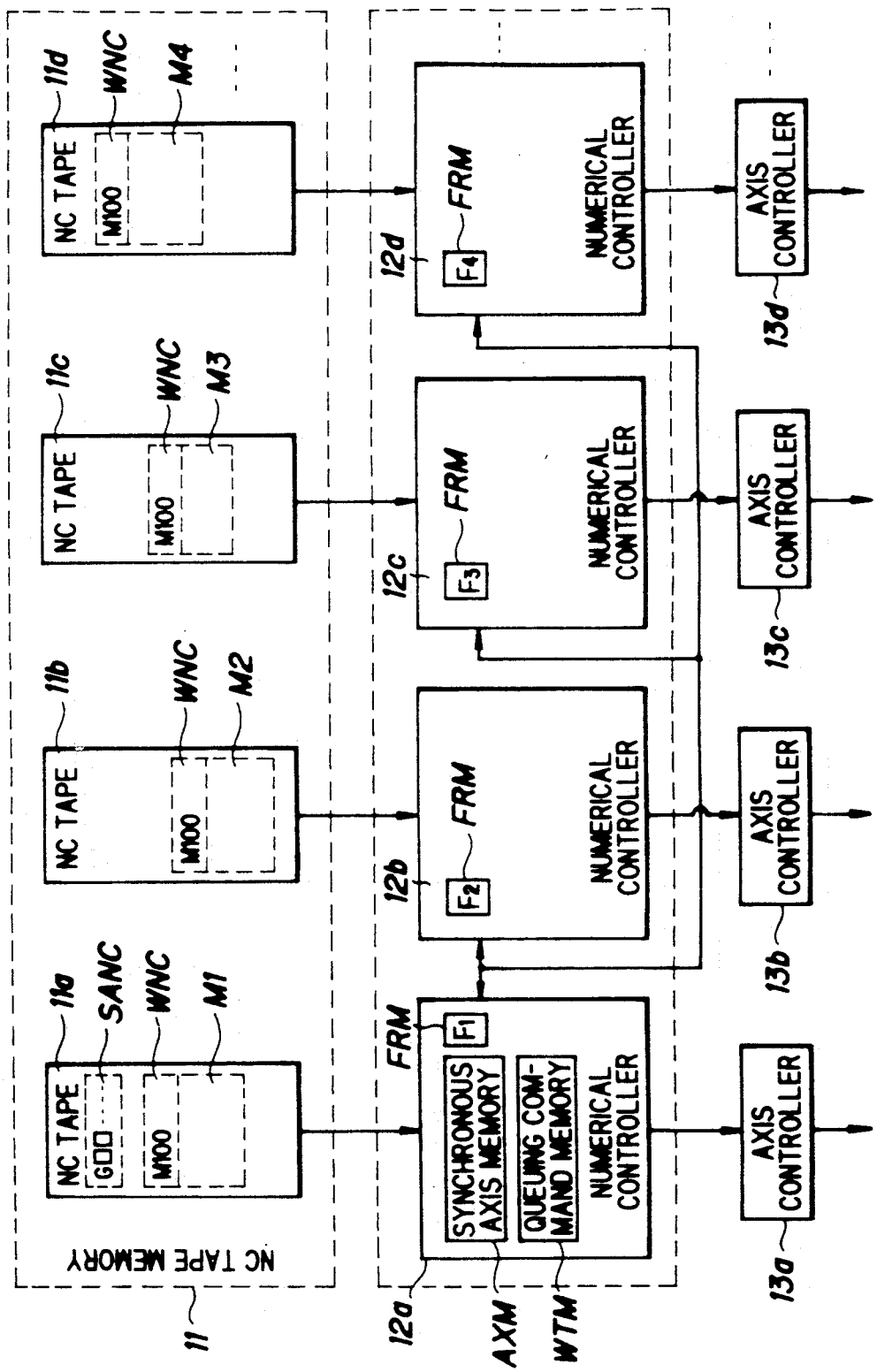
FIG. 1 is a block diagram of a numerical control apparatus according to the present invention.

FIG. 1 is a block diagram of a numerical control apparatus according to the present invention.

Figure 2:
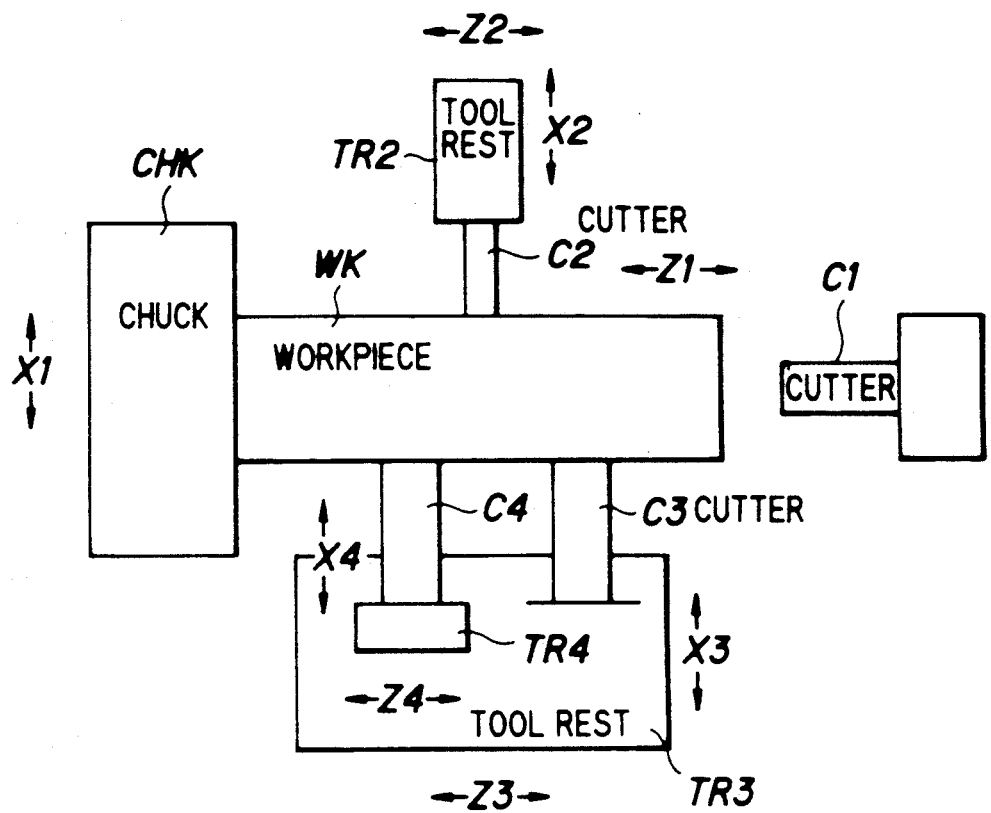
FIG. 2 is a view for describing the construction of a compound machine.

Numeral 11 denotes an NC tape memory in which NC tapes 11a–11d have been prepared for respective movable elements (tool rests, tables, etc). For example, assume that the machine tool to be numerically controlled is a compound machine of the kind shown in FIG. 2. More specifically, assume that the numerically controlled machine tool is a compound machine having the following three functions:

(i) A workpiece WK grasped by a chuck CHK is moved along X1 and Z1 axes by a mechanism, not shown, whereby the workpiece is subjected to drilling, boring or the like by a fixed cutter C1;

(ii) the workpiece is subjected to turning work by cutters C2, C3 attached to two turning tool rests TR2, TR3 capable of moving along X2, Z2 axes and X3, Z3 axes, respectively; and (iii) the workpiece is subjected to turning by a cutter C4 attached to a tool rest T4 capable of moving along X4, Z4 axes on the tool rest TR3. The four NC tapes 11a, 11b, 11c, 11d are provided for moving the workpiece WK and the tool rests TR2-TR4, respectively. The main NC tape 11a includes a synchronous axis command SANC for designating synchronous axes. A queuing command (e.g., "M100") WNC is inserted in the NC tape corresponding to each synchronous axis, and NC program portions M1-M4 for synchronous machining are inserted in respective ones of the NC tapes following the queuing commands. It should be noted that a synchronous axis command has the following format:

G□□ΔO∇...;

Here "G□□" is a G code for synchronous axis designation, in which □□ is a suitably decided two-digit numerical value, and Δ, O, ∇ are the names of the synchronous axes.

Numerals 12a-12d denote numerical controllers for performing numerical control processing based on the NC tapes 11a-11d. The main numerical controller 12a has a synchronous axis memory AXM for storing a designated synchronous axis, a flag memory FRM for storing a flag F1 which indicates that a queuing command has been issued, and a queuing command memory WTM for storing whether the NC tapes 11a-11d having commanded queuing. The other numerical controllers 11b-11d are provided with flag memories FRM for storing flags F2-F4 indicating whether queuing has been commanded.

Numerals 13a-13b denote axis controllers provided for corresponding ones of the numerical controllers 12a-12d, respectively. These controllers perform pulse distribution operations, acceleration/deceleration control, etc.

Figure 3:
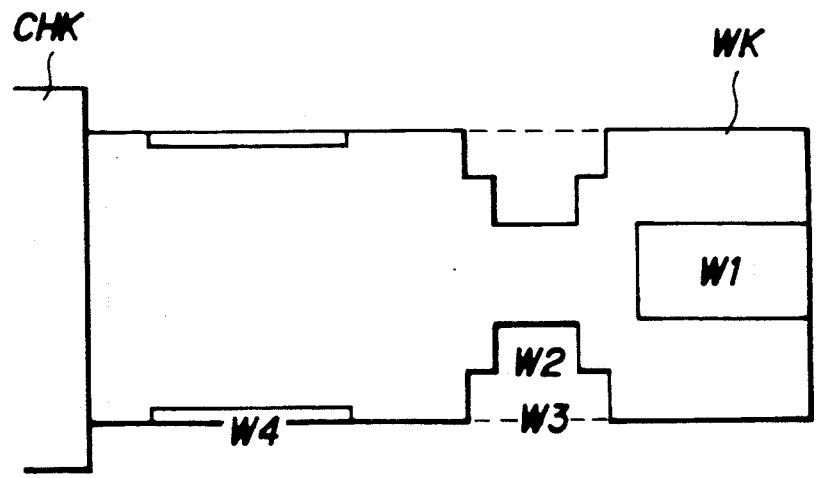
FIG. 3 is a view for describing machining.

The overall operation of FIG. 1 will now be described on the assumption that the results shown in FIG. 3 are obtained, so that hole machining W1 is performed by the cutter C1, turning work W2 is performed by the cutter C2, turning work W3 is performed by the cutter C3, and turning work (threading) is performed by the cutter C4.

Figure 4:
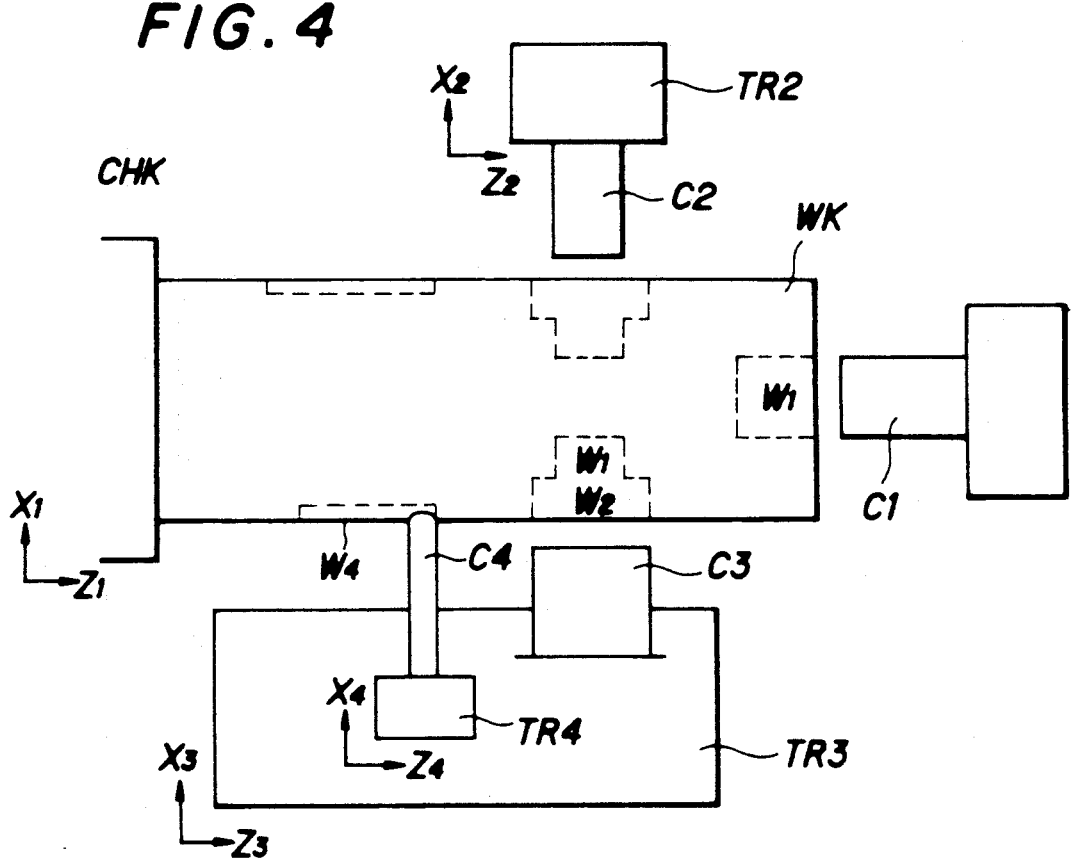
FIG. 4 is a view showing the state prior to the start of synchronous machining.

The following NC data for designating synchronous axes is inserted in the main NC tape 11a at an appropriate location:

G□□X1 Z1 X2 Z2 X3 Z3 X4 Z4;

and the queuing command "M100" is inserted in front of the NC program portion M1 for performing the hole machining W1. The queuing command "M100" is inserted in the NC tapes 11b-11d ahead of the NC program portions M2-M4 for performing the turning machining operations W2-W4, respectively. Furthermore, NC program portions which position the tool rests TR2-TR4 in the states shown in FIG. 4 are inserted ahead of the queuing commands "M100" of the tapes 11a-11d.

In response to the start of numerical control, the numerical controllers 12a-12d perform predetermined numerical control by reading NC data from the corresponding NC tapes 11a-11d one block at a time and, in response to reading of the queuing command "M100", turn on the corresponding flags F1-F4 and wait in synchronous fashion.

The numerical controller 12a stores the names of the synchronous axes, which have been designated by the synchronous axis command "G□□ ... " commanded ahead of the queuing command "M100", in the synchronous axis memory AXM. These synchronous axes are retained until updated by another synchronous axis command.

Next, the numerical controller 11a turns on the flag F1 in response to the queuing command "M100" and performs monitoring to determine whether the queuing command "M100" has been read from the NC tapes corresponding to the synchronous axes. That is, the controller refers to the flags F1-F4 to determine whether "M100" has been read from the NC tapes, and stores the results in the queuing command memory WTM.

If the queuing command "M100" has been read from all NC tapes corresponding to the axes designated as synchronous axes, each numerical controller is instructed to start synchronous operation. At the start of synchronous operation, each of the movable elements (the workpiece WK and the tool rests TR2-TR4) are positioned in the states shown in FIG. 4.

In response to being instructed to start synchronous operation, the numerical controllers 12a-12d perform numerical control processing based on the respective NC program portions M1-M4, whereby the machining operations W1-W4 (FIG. 3) are performed in synchronous fashion.

Figure 5:
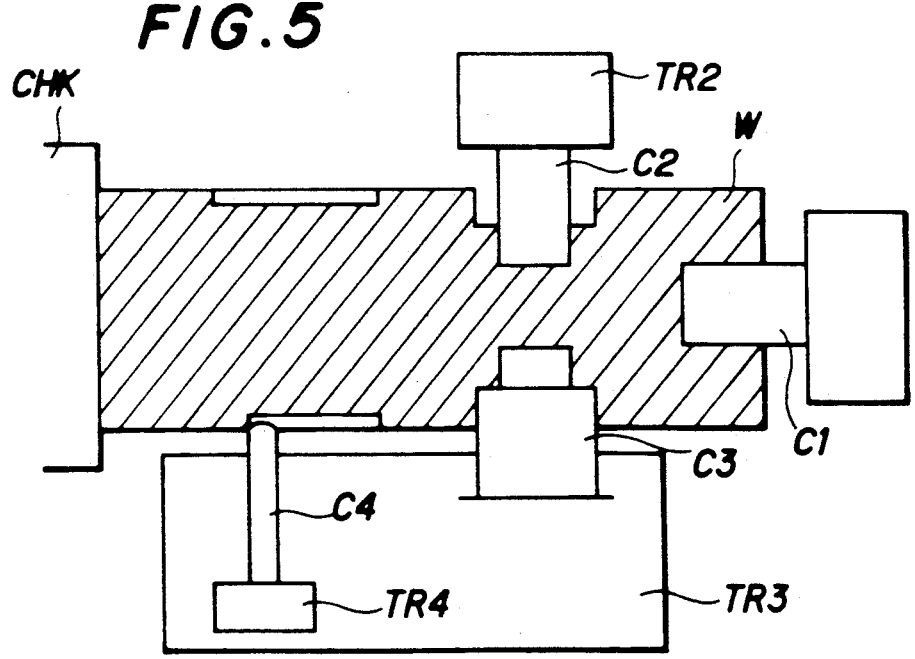
FIG. 5 is a view showing the state at the end of synchronous machining.

By virtue of the foregoing operations, the movable elements attain the states shown in FIG. 5, by way of example, when synchronous machining is completed. As a result, the synchronous machining operations W1-W4 are completed.

Figure 6:
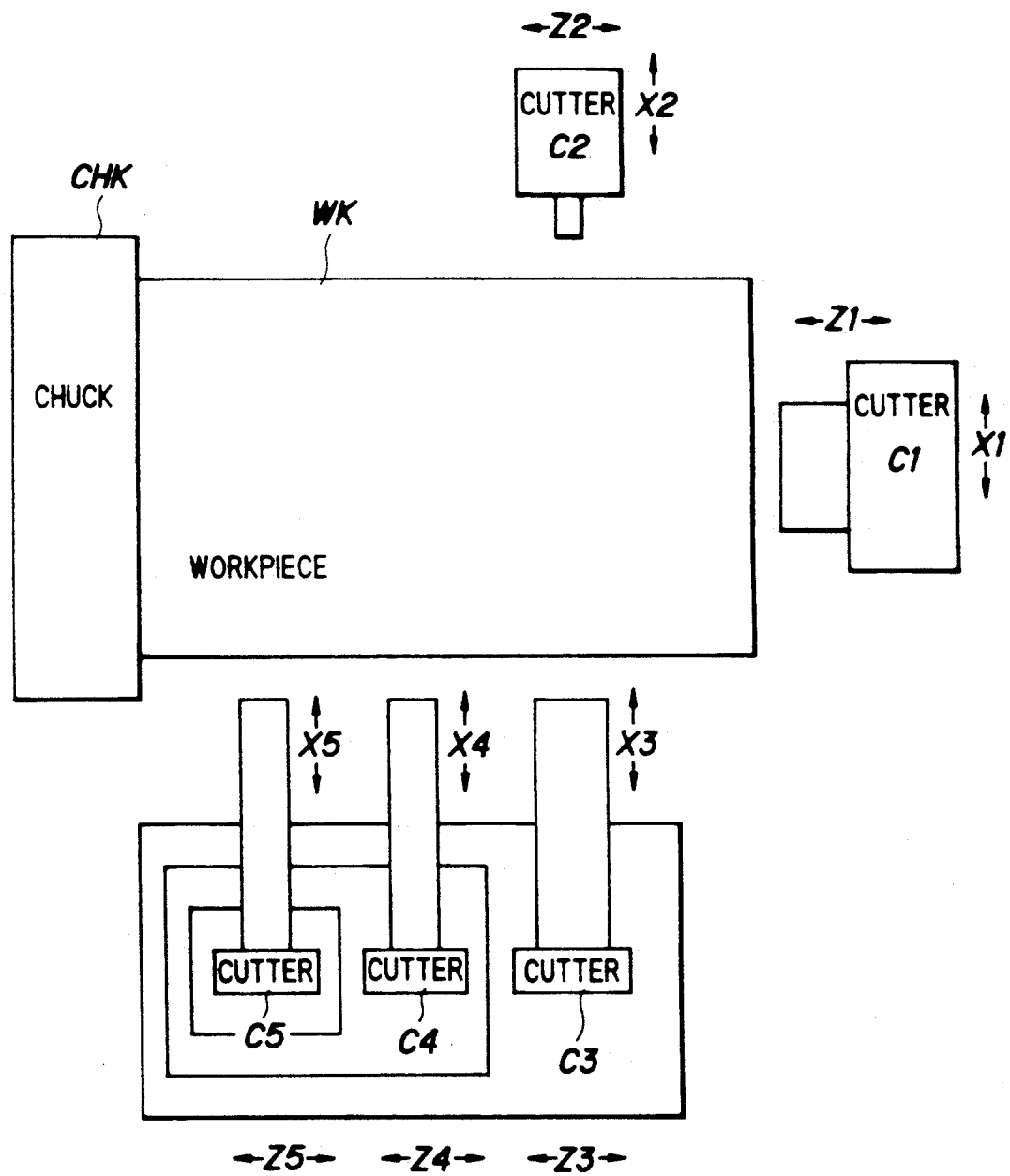
FIGS. 6 and 7 are views for describing another synchronous control operation according to the present invention.
Figure 7:
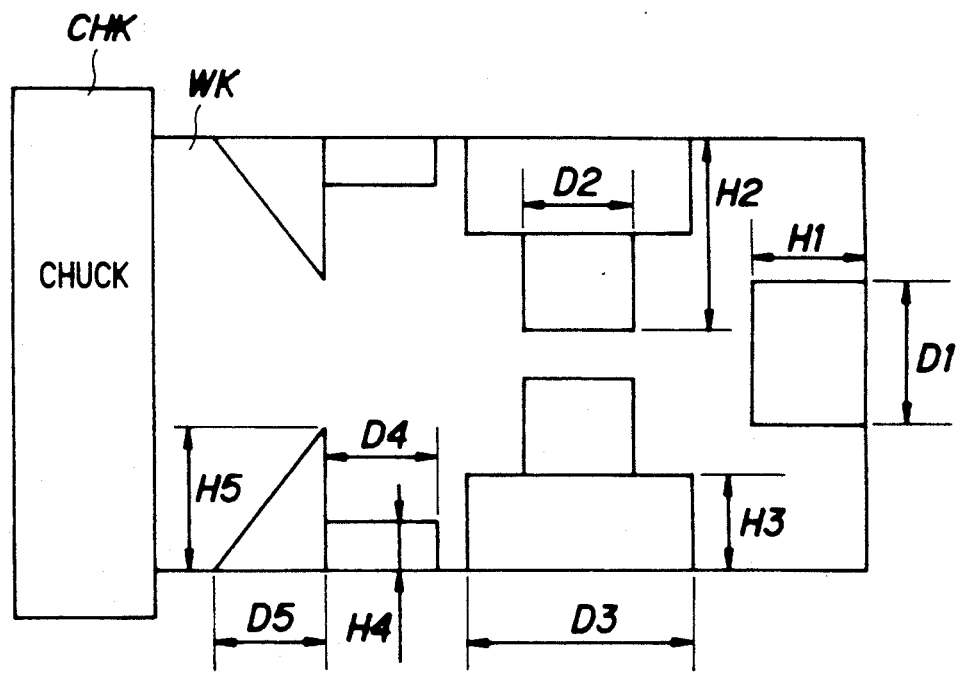
Figure 8:
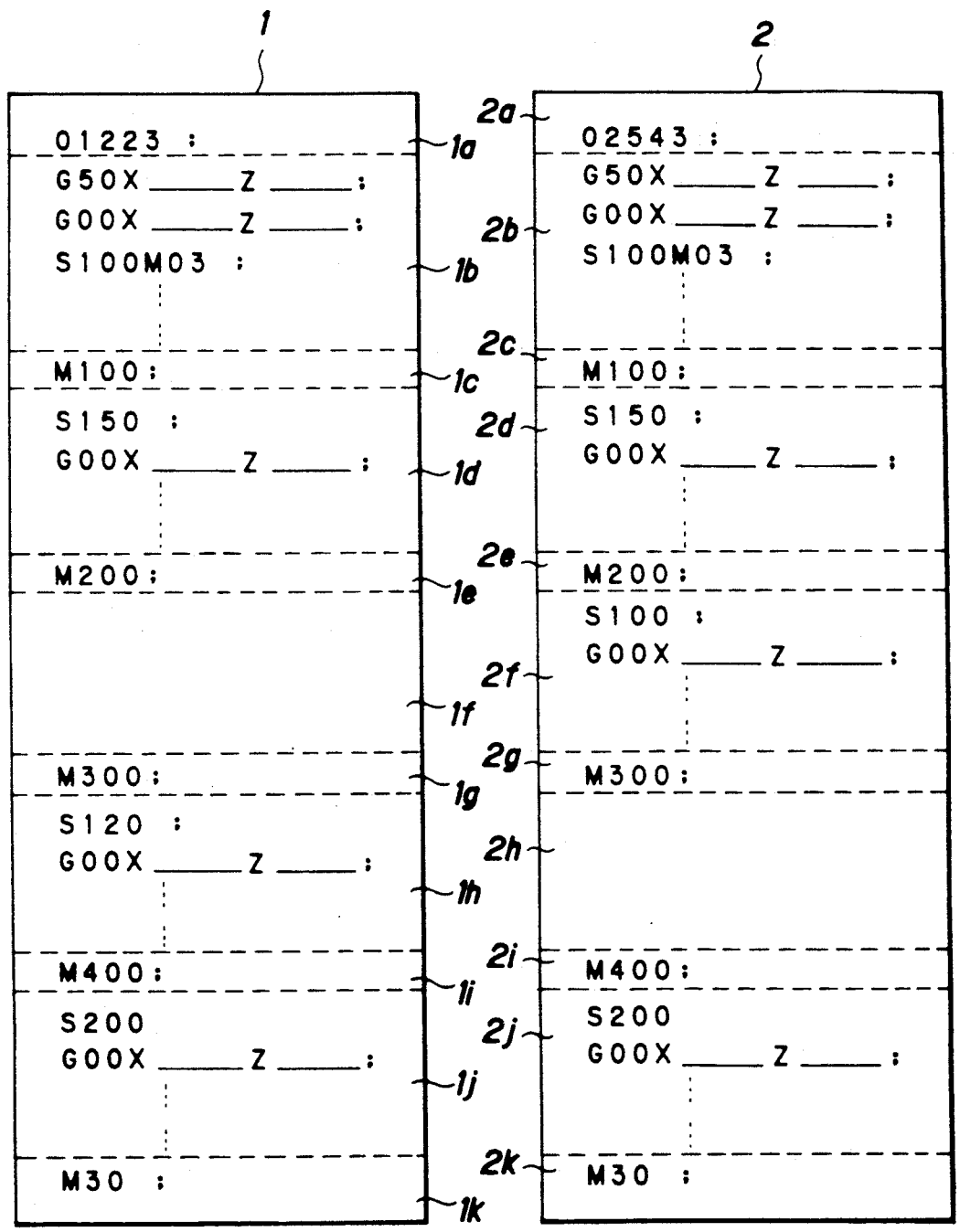
FIG. 8 is a view for describing NC programs having queuing commands.

FIGS. 6 and 7 are views for describing another synchronous machining operation in accordance with the present invention. In the arrangement of the compound machine shown in FIG. 6, CHK represents a chuck, WK represents a workpiece, and (i) C1 denotes a cutter controlled by axes X1, Z1 and capable of moving independently;

(ii) C2 denotes a cutter controlled by axes X2, Z2 and capable of moving independently;

(iii) C3 denotes a cutter controlled by axes X3, Z3 and capable of moving independently;

(iv) C4 denotes a cutter controlled by axes X4, Z4 and influenced by axes X3, Z3; and (v) C5 denotes a cutter controlled by axes X5, X5 and influenced by axes X4, Z4. More specifically, the cutters C1, C2 and C3 each move independently along the X and Z axes, but movement of the cutter C4 is influenced by movement of the cutter C3. Accordingly, the cutter C4 is the "child" of the cutter C3. Further, movement of the cutter C5 is influenced by movement of the cutter C4, so that the cutter C5 is the "child" of the cutter C4 and the "grandchild" of the cutter C3.

A case will now be described in which the machining shown in FIG. 7 is carried out by synchronously controlling the cutters C1-C5. FIG. 7 is the state which prevails when synchronous machining has ended. The amount of movement of each cutter will be considered letting $\Delta X_n$, $\Delta Y_n$ represent the amount of movement of cutter $C_n$ (n=1-5).

---

Cutter C1: If cutter diameter CD1 is the same as

-continued

```
           hole diameter D1, then
           ΔX1 = 0, ΔZ1 = H1 and the cutter cuts
           into the workpiece along the Z axis.
Cutter C2: If cutter diameter CD2 < groove
           width D2, then
           ΔX2 = H2, ΔZ2 = D2 and the cutter digs
           into the workpiece along the X axis and
           cuts into the workpiece along the Z
           axis.
Cutter C3: If cutter diameter CD3 < groove
           width D3, then
           ΔX3 = H3, ΔZ3 = D3 and the cutter digs
           into the workpiece along the X axis and
           cuts into the workpiece along the Z
           axis.
Cutter C4: If cutter diameter CD4 < groove
           width D4, then
           ΔX4 = H4, ΔZ4 = D4 and the cutter digs
           into the workpiece along the X axis and
           cuts into the workpiece along the Z
           axis. However, since cutter C3 which
           influences cutter C4 moves by ΔX3, ΔY3,
           in actuality we have
```

$$\left. \begin{array}{l} \Delta X4 = H4 - X3 = H4 - H3 \\ \Delta Z4 = D4 - Z3 = D4 - D3 \end{array} \right\} \quad (1)$$

```
           so that this cutter digs
           into the workpiece along the X axis and
           cuts into the workpiece along the Z
           axis accordingly.
Cutter C5: If cutter diameter CD5 < groove
           width D5, then
           ΔX5 = H5, ΔZ5 = D5 and the cutter digs
           into the workpiece along the X axis and
           cuts into the workpiece along the Z
           axis. However, since cutter C4 which
           influences cutter C5 moves by ΔX4, ΔY4,
           in actuality we have
```

$$\left. \begin{array}{l} \Delta X5 = H5 - X4 \\ \quad\;\; = H5 - (H4 - H3) \\ \quad\;\; = H5 - H4 + H3 \\ \Delta Z5 = D5 - Z4 \\ \quad\;\; = D5 - (D4 - D3) \\ \quad\;\; = D5 - D4 + D3 \end{array} \right\} \quad (2)$$

```
           so that this cutter digs
           into the workpiece along the X axis and
           cuts into the workpiece along the Z
           axis accordingly.
```

Thus, if the master-slave relationship, namely a parent-child relationship, is specified beforehand with regard to the movable elements and the numerical controllers (12a-12d in FIG. 1) are adapted in such a manner that the child receives the amount of movement of the parent from the parent and the operation of Eq. (1) or Eq. (2) is performed at the time of synchronous control, then the NC program of each cutter need only be programmed to define the shape desired to be cut and the programmer need not be concerned with whether a cutter is a "parent", "child", "grandchild", etc.

In accordance with the present invention as set forth above, the arrangement is such that a plurality of axes to be synchronously controlled are designated from a predetermined program, queuing commands are inserted in the NC programs conforming to the designated axes, and the corresponding movable elements are moved and controlled while synchronization is achieved by the queuing commands. As a result, a plurality of synchronously controlled axes can be designated at will by the NC programs, thereby eliminating idling axes and making possible highly efficient machining. In addition, according to the invention, it is possible to synchronously control even axes that are not controllable independently of one another, i.e., axes that have a "parent-child-grandchild" relationship.

We claim:

1. A numerical control method in which NC (numerical control) programs are provided for controlling corresponding movable elements performing machining by controlling prescribed axes, each movable element being moved by performing numerical control processing based on said NC programs, said method comprising the steps of:

a) designating a plurality of synchronous control axes in one of the NC programs;

b) inserting a queuing command in each of the NC programs corresponding to the movable elements performing machining which include said synchronous control axes; and c) controlling movement of the corresponding movable elements while synchronization is achieved by said queuing commands;

wherein step (c) further comprises the steps of:

c1) inserting said queuing command of each of said NC programs in front of a command for a machining operation to be synchronously controlled;

c2) determining whether queuing has been commanded by any of the NC programs;

c3) determining, if queuing has been commanded from one of the NC programs, whether queuing has been commanded from all of the other NC programs; and c4) executing, when queuing has been commanded from all of the NC programs, the command for the next machining operation.

2. A numerical control method according to claim 1, wherein when there are two movable elements to be synchronously controlled and movement of one movable element influences movement of another movable element, a main-subordinate relationship is specified in advance in which one element is adopted as a main movable element and the other element as a subordinate movable element, and step c) includes revising, by numerical information from the main movable element, numerical information in said command for the machining operation in the subordinate movable element.

* * * * *

UNITED STATES PATENT AND TRADEMARK OFFICE
CERTIFICATE OF CORRECTION

PATENT NO. : 5,173,648
DATED     : December 22, 1992
INVENTOR(S) : Hideaki Kawamura et al.

It is certified that error appears in the above-identified patent and that said Letters Patent is hereby corrected as shown below:

Col. 1, line 10, "Summary of the Invention" should be --Description of the Related Art--.

Col. 2, line 24, "Quening" should be "Queuing".

Col. 4, line 51, "X5, X5" should be --X5, Z5--.

Signed and Sealed this

Twenty-third Day of November, 1993

Attest:

BRUCE LEHMAN

*Attesting Officer*        *Commissioner of Patents and Trademarks*